(12) United States Patent
Lee et al.

(10) Patent No.: US 11,932,727 B2
(45) Date of Patent: Mar. 19, 2024

(54) PHTHALONITRILE-BASED RESIN WITH IMPROVED IMPACT STRENGTH

(71) Applicant: LG Chem, Ltd., Seoul (KR)

(72) Inventors: Seunghee Lee, 34122 (KR); Sang Woo Kim, Daejeon (KR); Youngdae Kim, Daejeon (KR); Eun Ho Kho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 841 days.

(21) Appl. No.: 16/977,379

(22) PCT Filed: Aug. 22, 2019

(86) PCT No.: PCT/KR2019/010708
§ 371 (c)(1),
(2) Date: Sep. 1, 2020

(87) PCT Pub. No.: WO2020/045897
PCT Pub. Date: Mar. 5, 2020

(65) Prior Publication Data
US 2021/0061953 A1    Mar. 4, 2021

(30) Foreign Application Priority Data

Aug. 28, 2018  (KR) .......................... 10-2018-0101457
Aug. 21, 2019  (KR) .......................... 10-2019-0102574

(51) Int. Cl.
*C08G 73/24* (2006.01)
*B29C 35/02* (2006.01)
*C08G 73/02* (2006.01)
*C08G 73/06* (2006.01)
*C08K 5/3417* (2006.01)

(52) U.S. Cl.
CPC ............ *C08G 73/024* (2013.01); *B29C 35/02* (2013.01); *C08G 73/0266* (2013.01); *C08G 73/0672* (2013.01); *C08K 5/3417* (2013.01)

(58) Field of Classification Search
USPC ....................................................... 528/422
See application file for complete search history.

(56) References Cited

U.S. PATENT DOCUMENTS

| 4,259,471 A * | 3/1981 | Keller ................ C08G 73/0672 |
| | | 528/206 |
| 4,304,896 A * | 12/1981 | Keller .................... C08G 73/06 |
| | | 528/166 |
| 5,242,755 A | 9/1993 | Keller et al. |
| 6,001,926 A | 12/1999 | Sastri et al. |
| 2018/0155276 A1 | 6/2018 | Kim et al. |
| 2018/0194895 A1 | 7/2018 | Ahn et al. |
| 2018/0346646 A1 | 12/2018 | Kim et al. |
| 2019/0119489 A1 | 4/2019 | Nakatani et al. |
| 2019/0127525 A1 | 5/2019 | Lee et al. |
| 2019/0169364 A1 | 6/2019 | Kim et al. |
| 2019/0292317 A1 | 9/2019 | Lee et al. |

FOREIGN PATENT DOCUMENTS

| CN | 1876615 A | 12/2006 |
| CN | 102936340 A | 2/2013 |
| CN | 103834008 B | 9/2016 |
| CN | 107709410 A | 2/2018 |
| CN | 108368261 A | 8/2018 |
| CN | 108431085 A | 8/2018 |

(Continued)

OTHER PUBLICATIONS

International Search Report from PCT/KR2019/010708, dated Dec. 5, 2019.

(Continued)

*Primary Examiner* — Terressa Boykin
(74) *Attorney, Agent, or Firm* — Bryan Cave Leighton Paisner LLP

(57) ABSTRACT

Provided is a phthalonitrile-based resin, comprising repeat units formed by the reaction of a phthalonitrile compound and a curing agent, wherein the phthalonitrile compound comprises 4,4'-bis(3,4-dicyanophenoxy)diphenyloxide of the following Chemical Formula 1 and 4,4'-bis(3,4-dicyanophenoxy)biphenyl of the following Chemical Formula 2 at a weight ratio of 30:70 to 90:10:

Chemical Formula 1

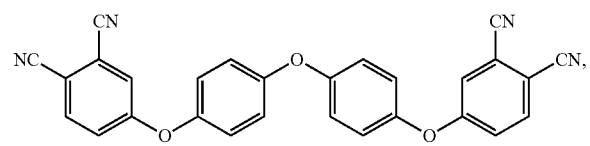

Chemical Formula 2

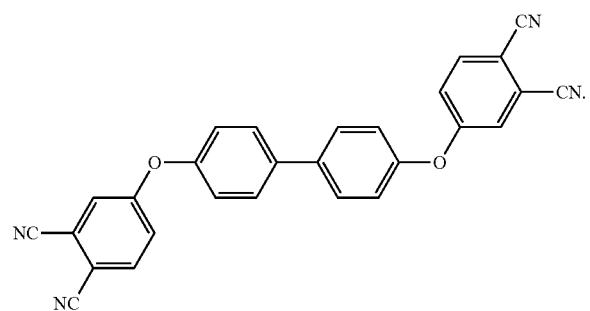

6 Claims, 3 Drawing Sheets

(56) References Cited

FOREIGN PATENT DOCUMENTS

| | | | |
|---|---|---|---|
| EP | 3396183 A1 * | 10/2018 | ............ C08J 5/04 |
| JP | 2019-522714 A | 8/2019 | |
| KR | 20010030872 A | 4/2001 | |
| KR | 10-2008-0098435 A | 11/2008 | |
| KR | 10-2016-0115543 A | 10/2016 | |
| KR | 10-2017-0036543 A | 4/2017 | |
| KR | 10-2017-0060897 A | 6/2017 | |
| KR | 10-2017-0065954 A | 6/2017 | |
| KR | 10-2017-0082993 A | 7/2017 | |
| KR | 10-2018-0036162 A | 4/2018 | |
| KR | 10-2018-0074043 A | 7/2018 | |
| WO | 2007/102766 A1 | 9/2007 | |
| WO | 2017/169738 A1 | 10/2017 | |
| WO | 2018-097496 A2 | 5/2018 | |

OTHER PUBLICATIONS

Written Opinion of the ISA from PCT/KR2019/010708, dated Dec. 5, 2019.

* cited by examiner

PHTHALONITRILE-BASED RESIN WITH IMPROVED IMPACT STRENGTH

CROSS-REFERENCE TO RELATED APPLICATIONS

This application is a National Stage Application of International Application No. PCT/KR2019/010708 filed on Aug. 22, 2019, which claims priority to Korean Patent Application No. 10-2018-0101457 filed on Aug. 28, 2018 and Korean Patent Application No. 10-2019-0102574 filed on Aug. 21, 2019 with the Korean Intellectual Property Office, the disclosures of which are herein incorporated by reference in their entirety.

TECHNICAL FIELD

The present invention relates to phthalonitrile-based resin.

BACKGROUND OF ART

Phthalonitrile-based resin is known as thermosetting resin having excellent heat resistance and flame retardancy. A resin composition comprising phthalonitrile-based resin and additives such as glass fiber, carbon fiber, and the like can be used as durable goods in airplanes, ships, automobiles, and the like.

The phthalonitrile-based resin is generally formed by polymerization and high temperature curing of a phthlonitrile compound having two or more phthalonitrile groups and a curing agent therefor.

In general, the phthalonitrile compound has many aromatic groups, and thus, has high rigidity and large molecular weight. Thus, a mixture of the phthalonitrile compound and a curing agent or a prepolymer formed by the reaction of the mixture has very narrow process window.

The process window is one of the measures showing the processibility of resin, and can be represented by the absolute value of a difference $(T_c-T_p)$ between the processing temperature $(T_p)$ at which a mixture of the phthalonitrile compound and a curing agent or a prepolymer formed by the reaction of the mixture exist in a processible state and the curing temperature $(T_c)$.

Since phthalonitrile resin has a rigid cured structure by triazine produced through high temperature curing, it has a disadvantage of very weak mechanical properties such as impact strength.

Thus, in order to expand the applicable range of the phthalonitrile-based resin, it is needed to reinforce impact strength as well as to improve process window for securing processibility.

DETAILED DESCRIPTION OF THE INVENTION

Technical Problem

It is an object of the present invention to provide phthalonitirle-based resin having excellent processibility and improved impact strength.

Technical Solution

According to the present invention, phthalonitrile-based resin comprising repeat units formed by the reaction of a phthalonitrile compound and a curing agent is provided, wherein the phthalonitrile compound comprises 4,4'-bis(3,4-dicyanophenoxy)diphenyloxide of the following Chemical Formula 1 and 4,4'-bis(3,4-dicyanophenoxy)biphenyl of the following Chemical Formula 2 at a weight ratio of 30:70 to 90:10:

Chemical Formula 1

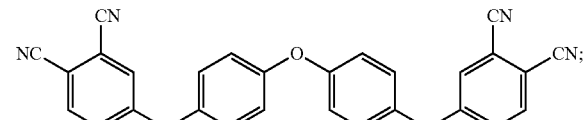

Chemical Formula 2

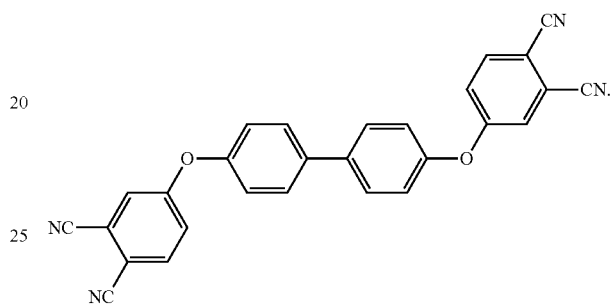

Hereinafter, phthalonitrile-based resin according to the embodiments of the invention will be explained in detail.

First, the technical the terms used herein are only to explain specific embodiments, and are not intended to limit the present invention.

A singular expression includes a plural expression thereof, unless it is expressly stated or obvious from the context that such is not intended.

As used herein, the term "comprise" is intended to designate the existence of practiced characteristic, number, step, constructional element or combinations thereof, and it is not intended to preclude the possibility of existence or addition of one or more other characteristics, numbers, steps, constructional elements or combinations thereof.

I. Phthalonitrile-based Resin

According to one embodiment of the invention, phthalonitrile-based resin comprising repeat units formed by the reaction of a phthalonitrile compound and a curing agent is provided, wherein the phthalonitrile compound comprises 4,4'-bis(3,4-dicyanophenoxy)diphenyloxide of the following Chemical Formula 1 and 4,4'-bis(3,4-dicyanophenoxy)biphenyl of the following Chemical Formula 2 at a weight ratio of 30:70 to 90:10:

Chemical Formula 1

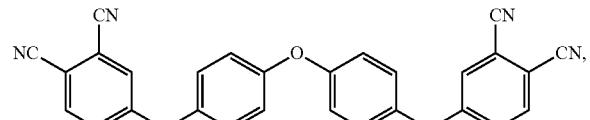

Chemical Formula 2

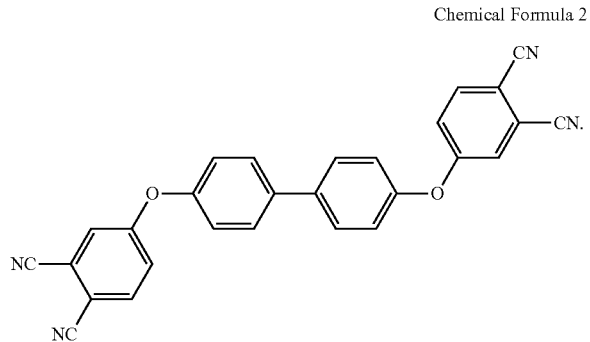 [SMILES: N#Cc1ccc(Oc2ccc(-c3ccc(Oc4ccc(C#N)c(C#N)c4)cc3)cc2)cc1C#N]

As the results of continuous studies of the present inventors, it was confirmed that phthalonitrile-based resin comprising the phthalonitrile compounds of the Chemical Formulas 1 and 2 at a weight ratio of 30:70 to 90:10 not only has excellent processability, but also exhibits improved impact strength.

The phthalonitrile-based resin having the above properties can provide durable goods that can be more suitably used in airplanes, ships, automobiles, and the like.

The phthalonitrile-based resin can be prepared from a polymerizable composition comprising a phthalonitrile compound and a curing agent.

(1) Phthalonitrile Compound

As the phthalonitrile compounds, 4,4'-bis(3,4-dicyanophenoxy)diphenyloxide (hereinafter, referred to as "PN1") of the following Chemical Formula 1 and 4,4'-bis(3,4-dicyanophenoxy)biphenyl (hereinafter, referred to as "PN2") of the following Chemical Formula 2 are included at a weight ratio of 30:70 to 90:10.

Preferably, the weight ratio of PN1 and PN2 (PN1:PN2) can be 30:70 to 90:10, or 35:65 to 90:10, or 30:70 to 85:15, or 40:60 to 90:10, or 30:70 to 75:25, or 50:50 to 90:10, or 30:70 to 60:40, or 40:60 to 85:15, or 40:60 to 75:25.

Specifically, the weight ratio of PN1 and PN2 (PN1:PN2) can be 30:70, or 35:65, or 40:60, or 45:55, or 50:50, or 55:45, or 60:40, or 65:35, or 70:30, or 75:25, or 80:20, or 85:15, or 90:10.

In order to sufficiently achieve the improvement effect of processability and impact strength, it is preferable that PN1 is included in an amount of 30 wt % or more in the phthalonitrile compound. However, if the content of PN1 is too high, the impact strength of the phthalonitrile-based resin can be deteriorated. Thus, it is preferable that PN2 is included in an amount of 10 wt % or more in the phthalonitrile compound.

(2) Curing Agent

The curing agent of the phthalonitrile compound is not specifically limited as long as it can react with the phthalonitrile compound to form phthalonitrile resin.

For example, as the curing agent, one or more selected from the group consisting of amine-based compounds, hydroxyl-based compounds and imide-based compounds can be used.

The amine-based compound, hydroxyl-based compound and imide-based compound respectively are a compound comprising at least one amino group, hydroxyl group and imide group in the molecule.

Preferably, the curing agent can be an imide-based compound of the following Chemical Formula 3:

Chemical Formula 3

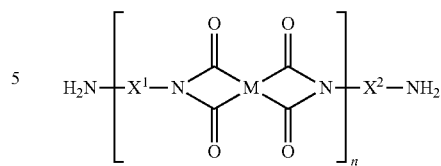

wherein in Chemical Formula 3:

M is a tetravalent radical derived from an aliphatic, alicyclic or aromatic compound;

each of $X^1$ and $X^2$ is independently an alkylene group, an alkylidene group, or a divalent radical derived from an aromatic compound; and n is a number equal to or greater than 1.

Such an imide-based compound of Chemical Formula 3 exhibits excellent heat resistance because it comprises an imide structure in the molecule, and thus, even if it is included in an excessive amount in the polymerizable composition, or the polymerizable composition is processed or cured at high temperature, a polymerizable composition that does not generate defects such as voids that can have a bad influence on the properties can be prepared.

In Chemical Formula 3, M can be a tetravalent radical derived from an aliphatic, alicyclic or aromatic compound, and it can have a structure wherein radicals formed by dehydrogenation of 4 hydrogen atoms in the molecule of the aliphatic, alicyclic or aromatic compound are respectively connected with the carbon atoms of the carbonyl group of Chemical Formula 9.

Specifically, as the aliphatic compound, linear or branched alkane, alkene or alkyne can be used. As the aliphatic compound, C2-20, C2-16, C2-12, C2-8 or C2-4 alkane, alkene, or alkyne can be used. The alkane, alkene, or alkyne can be optionally substituted with one or more substituents.

As the alicyclic compound, hydrocarbon compounds comprising C3-20, C3-16, C3-12, C3-8 or C3-4 nonaromatic ring structures can be used. Such an alicyclic hydrocarbon compound can comprise at least one hetero atom such as oxygen or nitrogen as a ring member, and if necessary, it can be optionally substituted with one or more substituents.

In addition, as the aromatic compound, benzene, benzene-containing compounds or derivatives thereof can be used. The benzene-containing compound can be a compound wherein two or more benzene rings are condensed while sharing one or two or more carbon atoms, or directly connected, or connected by an appropriate linker.

As the linker used to connect two benzene rings, an alkylene group, an alkylidene group, —O—, —S—, —C(=O)—, —S(=O)—, —S(=O)$_2$—, —C(=O)—O-$L^1$-O—C(=O—)—, -$L^2$-C(=O)—O-$L^3$-, -$L^4$-O—C(=O)-$L^5$-, or -$L^6$-$Ar^1$-$L^7$-$Ar^2$-$L^8$-, etc. can be used.

Each of $L^1$ to $L^8$ can be independently a single bond, —O—, an alkylene group, or an alkylidene group, and each of $Ar^1$ and $Ar^2$ can be independently an arylene group.

The aromatic compound can comprise, for example, 6 to 30, 6 to 28, 6 to 27, 6 to 25, 6 to 20 or 6 to 12 carbon atoms, and if necessary, can be substituted with one or more substituents. In case the aromatic compound comprises the above explained linker, the number of carbon atoms of the aromatic compound is a number including the carbon atom existing in the linker, Specifically, for example, in Chemical Formula 3, M can be a tetravalent radical derived from alkane, alkene, or alkyne, or a tetravalent radical derived from the compound of any one of the following Chemical Formulas 4 to 9:

Chemical Formula 4

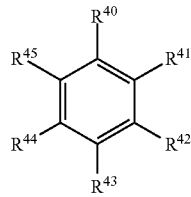

wherein in Chemical Formula 4, each of $R^{40}$ to $R^{45}$ is independently hydrogen, an alkyl group, an alkoxy group, or an aryl group;

Chemical Formula 5

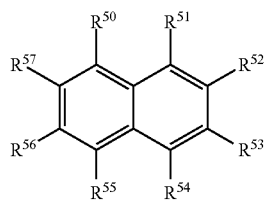

wherein in Chemical Formula 5, each of $R^{50}$ to $R^{57}$ is independently hydrogen, an alkyl group, an alkoxy group, or an aryl group;

Chemical Formula 6

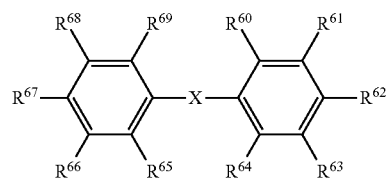

wherein in Chemical Formula 6:
each of $R^{60}$ to $R^{69}$ is independently hydrogen, an alkyl group, an alkoxy group, or an aryl group;
X is a single bond, an alkylene group, an alkylidene group, —O—, —S—, —C(=O)—, —S(=O)—, —S(=O)$_2$—, —C(=O)—O-$L^1$-O—C(=O)—, -$L^2$-C(=O)—O-$L^3$-, -$L^4$-O—C(=O)- $L^5$-, or -$L^6$-$Ar^1$-$L^7$-$Ar^2$-$L^8$-;
each of $L^1$ to $L^8$ is independently a single bond, —O—, an alkylene group, or an alkylidene group; and
each of $Ar^1$ and $Ar^2$ is independently an arylene group.
Herein, the single bond means that any atom does not exist at that part. Thus, in Chemical Formula 6, if X is a single bond, no atom exists at a part indicated by X, and in this case, the benzene rings of both sides of X can be directly connected to form a biphenyl structure.
Among the X in Chemical Formula 6, in —C(=O)—O-$L^1$-O—C(=O)—, -$L^2$-C(=O)—O-$L^3$-, or -$L^4$- O—C(=O)-$L^5$-, each of $L^1$ to $L^5$ can be independently a C1-12, C1-8, or C1-4 alkylene group or alkylidene group, and the alkylene group or alkylidene group can be substituted or unsubstituted.
Also, among the X in Chemical Formula 6, in -$L^6$-$Ar^1$-$L^7$-$Ar^2$-$L^8$-, $L^6$ and $L^8$ can be —O—, $L^7$ can be a C1-12, C1-8, or C1-4 alkylene group or alkylidene group, and the alkylene group or alkylidene group can be substituted or unsubstituted. $Ar^1$ and $Ar^2$ can be a phenylene group, and in this case, on the basis of $L^7$, each of $L^6$ and $L^8$ can be connected at the ortho, meta or para position of the phenylene.

Chemical Formula 7

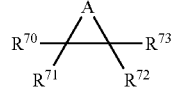

wherein in the Chemical Formula 7:
each of $R^{70}$ to $R^{73}$ is independently hydrogen, an alkyl group, or an alkoxy group, and two of $R^{70}$ to $R^{73}$ can be connected to each other to form an alkylene group; and
A is an alkylene group or an alkenylene group, and the alkylene group or alkenylene group of A can comprise one or more oxygen atoms as a hetero atom;

Chemical Formula 8

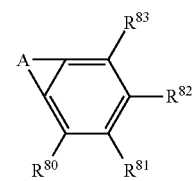

wherein in Chemical Formula 8:
each of $R^{80}$ to $R^{83}$ is independently hydrogen, an alkyl group, or an alkoxy group; and
A is an alkylene group;

Chemical Formula 9

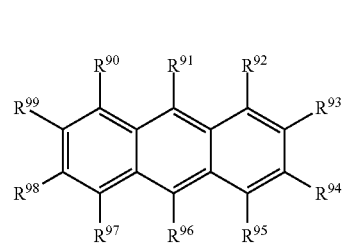

wherein in Chemical Formula 9, each of $R^{90}$ to $R^{99}$ is independently hydrogen, an alkyl group, or an alkoxy group.
The tetravalent radical derived from the compound of any one of Chemical Formulas 4 to 9 can be formed by direct removal of the substituents of the Chemical Formula 4 to 9, or can be formed by dehydrogenation of the hydrogen atom of the alkyl group, alkoxy group, aryl group, alkylene group, or alkenylene group in the substituents.
For example, in case the tetravalent radical is derived from the compound of Chemical Formula 4, one or more, two or more, three or more, or four of $R^{40}$ to $R^{45}$ of the Chemical Formula 4 can form a radical, or hydrogen atoms of the alkyl group, alkoxy group or aryl group existing in $R^{40}$ to $R^{45}$ can leave to form a radical. The formation of a radical means that the group is connected to the carbon atom of the carbonyl group of the Chemical Formula 4, as explained above.
And, in case the tetravalent radical is derived from the compound of Chemical Formula 6, each of $R^{60}$ to $R^{69}$ is independently hydrogen, an alkyl group, an alkoxy group, or an aryl group, and one or more, two or more, three or more or four of $R^{60}$ to $R^{69}$ can form a radical connected to Chemical Formula 3. Each of $R^{60}$ to $R^{69}$ that does not form a radical can be hydrogen, an alkyl group or an alkoxy group, or can be hydrogen or an alkyl group. For example, in the Chemical Formula 6, two of $R^{67}$ to $R^{69}$ and two of $R^{62}$ to $R^{64}$ can form the radical, and other substituents can be independently hydrogen, an alkyl group, an alkoxy group, or an aryl group, or can be hydrogen, an alkyl group or an alkoxy group, or can be hydrogen or an alkyl group.

As non-limiting examples, the compound of Chemical Formula 4 can be benzene or 1,2,4,5-tetraalkylbenzene.

As non-limiting examples, the compound of Chemical Formula 6 can be biphenyl or a compound of any one of the following Chemical Formulas A to F:

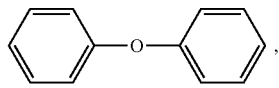

Chemical Formula A

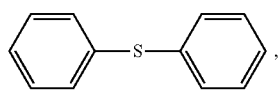

Chemical Formula B

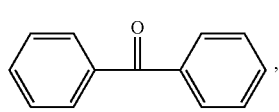

Chemical Formula C

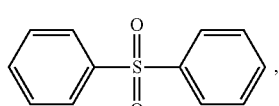

Chemical Formula D

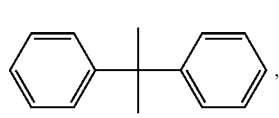

Chemical Formula E

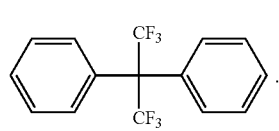

Chemical Formula F

And, the compound of the Chemical Formula 7 can be C4-8 cycloalkane such as cyclohexane, etc., C4-8 cycloalkene such as cyclohexene that can be substituted with one or more alkyl groups, etc., or a compound of any one of the following Chemical Formulas G to I:

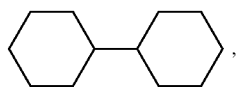

Chemical Formula G

Chemical Formula H

Chemical Formula I

And, the compound of Chemical Formula 8 can be a compound of the following Chemical Formula J, or a compound of the following Chemical Formula J, at least one hydrogen of which is substituted with an alkyl group.

Chemical Formula J

In Chemical Formula 3, each of $X^1$ and $X^2$ can be independently a divalent radical derived from an aromatic compound. For example, each of $X^1$ and $X^2$ can be independently a divalent radical derived from a C6-40 aromatic compound. The divalent radical derived from an aromatic compound is as explained above.

Specifically, in Chemical Formula 3, each of $X^1$ and $X^2$ can be independently a divalent radical derived from a compound of any one of the following Chemical Formulas 10 to 12:

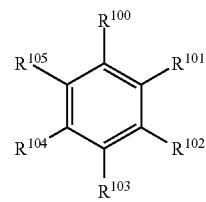

Chemical Formula 10 wherein in Chemical Formula 10, each of $R^{100}$ to $R^{105}$ is independently hydrogen, an alkyl group, an alkoxy group, an aryl group, a hydroxy group, or a carboxyl group;

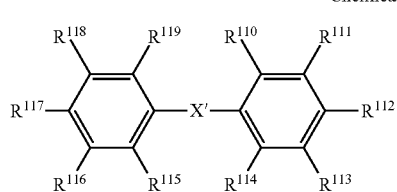

Chemical Formula 11 wherein in Chemical Formula 11:

each of $R^{110}$ to $R^{119}$ is independently hydrogen, an alkyl group, an alkoxy group, an aryl group, a hydroxy group, or a carboxyl group;

X' is a single bond, an alkylene group, an alkylidene group, —O—, —S—, —C(=O)—, —NR$^a$—, —S(=O)—, —S(=O)$_2$—, -L$^9$-Ar$^3$-L$^{10}$- or -L$^{11}$Ar$^4$-L$^{12}$-Ar$^5$-L$^{13}$-;

$R^a$ is hydrogen, an alkyl group, an alkoxy group, or an aryl group; each of $L^9$ to $L^{13}$ is independently a single bond, —O—, an alkylene group, or an alkylidene group; and each of $Ar^3$ to $Ar^5$ is independently an arylene group, Chemical Formula 12

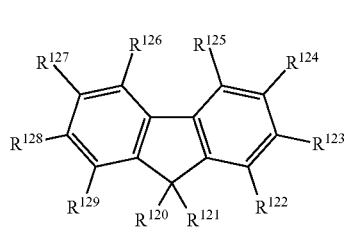

wherein in Chemical Formula 12, each of $R^{120}$ to $R^{129}$ is independently hydrogen, an alkyl group, an alkoxy group, an aryl group, a hydroxy group, or a carboxyl group.

The divalent radical derived from the compound of any one of Chemical Formulas 10 to 12 can be formed by direct removal of the substituents of Chemical Formulas 10 to 12, or can be formed by dehydrogenation of the hydrogen atom of the alkyl group, alkoxy group, aryl group, alkylene group, or alkenylene group in the examples of the substituents.

For example, in case the divalent radical is derived from the compound of Chemical Formula 10, for example, phenylene, the substitution position of the amine group on the basis of a part connected to N at $X^1$ of Chemical Formula 3 can be ortho, meta or para, and the substitution position of the amine group on the basis of a part connected to N at $X^2$ of Chemical Formula 3 can be also ortho, meta or para.

In addition, in case the divalent radical is derived from the compound of Chemical Formula 11, one of $R^{117}$ to $R^{119}$ of Chemical Formula 11 and one of $R^{112}$ to $R^{114}$ of Chemical Formula 11 can form a radical connected to the nitrogen atom of the Chemical Formula 3. Other substituents excluding the substituents forming radicals can be independently hydrogen, an alkyl group, an alkoxy group or an aryl group, or can be hydrogen, an alkyl group or an alkoxy group, or can be hydrogen or an alkyl group.

As non-limiting examples, the compound of Chemical Formula 10 can be benzene that can be substituted with at least one hydroxyl group or carboxyl group.

And, the compound of Chemical Formula 11 can be biphenyl that can be substituted with at least one hydroxyl group or carboxyl group, a compound of any one of Chemical Formulas A to F, which can be substituted with at least one hydroxyl group or carboxyl group, or a compound of any one of the following Chemical Formulas K to M, which can be substituted with at least one hydroxyl group or carboxyl group:

Chemical Formula K

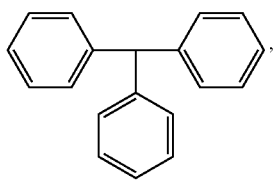

Chemical Formula L

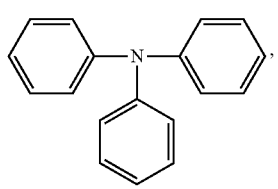

Chemical Formula M

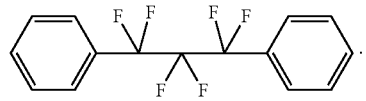

And, the compound of Chemical Formula 12 can be a compound of the following Chemical Formula N, or a compound of the following Chemical Formula N, at least one hydrogen of which is substituted with a hydroxyl group or a carboxyl group:

Chemical Formula N

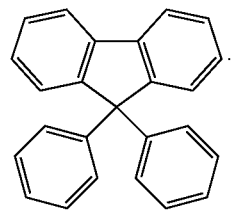

Throughout the specification, the alkyl group can be a C1-20, C1-16, C1-12, C1-8, or C1-4 alkyl group, unless otherwise described. The alkyl group can be linear, branched or cyclic, and if necessary, can be substituted with one or more substituents.

The alkoxy group can be a C1-20, C1-16, C1-12, C1-8, or C1-4 alkoxy group, unless otherwise described. The alkoxy group can be linear, branched or cyclic, and if necessary, can be substituted with one or more substituents.

The aryl group means a monovalent residue derived from the above described aromatic compound, unless otherwise described.

The alkylene group and alkylidene group can be a C1-20, C1-16, C1-12, C1-8, or C1-4 alkylene group and alkylidene group, unless otherwise described. The alkylene group and alkylidene group can be linear, branched or cyclic, and if necessary, can be optionally substituted with one or more substituents.

Throughout the specification, as the substitutent with which the aliphatic compound, alicyclic compound, aromatic compound, alkyl group, alkoxy group, aryl group, alkylene group, or alkylidene group, etc. can be optionally substituted, halogen such as chlorine or fluorine, etc., an epoxy group such as a glycidyl group, an epoxyalkyl group, a glycidoxyalkyl group, or alicyclic epoxy group, etc., an acryloyl group, a methacryloyl group, an isocyanate group, a thiol group, an alkyl group, an alkoxy group, or an aryl group, etc. can be used, but not limited thereto.

And, in the Chemical Formula 9, n means the number of imide repeat units, and it can be a number equal to or greater than 1. Specifically, n can be a number in the range of 1 to 200, 1 to 150, 1 to 100, 1 to 90, 1 to 80, 1 to 70, 1 to 60, 1 to 50, 1 to 40, 1 to 30, 1 to 20, or 1 to 10.

As non-limiting examples, the curing agent can be a compound of the following Chemical Formula C1 or the following Chemical Formula C2:

Chemical Formula C1

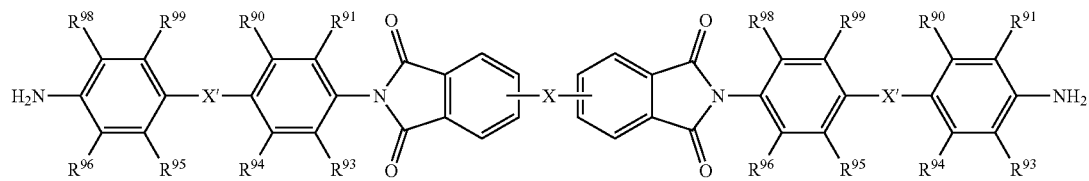

Chemical Formula C2

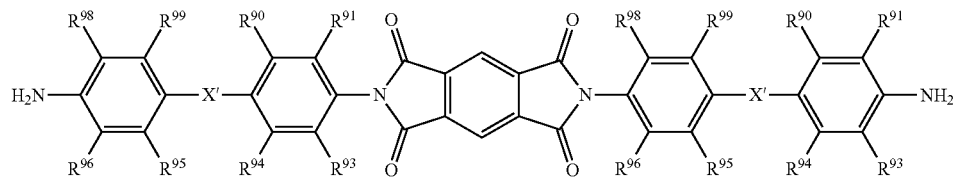

wherein in Chemical Formulas C1 and C2:

each of X and X' is independently a direct bond, a $C_{1-5}$ alkylene group, —O—, —S—, —C(=O)—, —S(=O)—, —S(=O)$_2$—, —C(=O)—O-$L^1$-O—C(=O)—, -$L^2$-C(=O)—O-$L^3$-, -$L^4$-O—C(=O)-$L^5$-, or -$L^6$-$Ar^1$-$L^7$-$Ar^2$-$L^8$-;

each of $L^1$ to $L^8$ is independently a direct bond, —O—, or a $C_{1-5}$ alkylene group;

each of $Ar^1$ and $Ar^2$ is independently a $C_{6-30}$ arylene group; and each of $R^{90}$ to $R^{99}$ is independently hydrogen, a $C_{1-5}$ alkyl group, a $C_{1-5}$ alkoxy group, a $C_{6-30}$ aryl group, a hydroxy group, or a carboxyl group.

The compound of Chemical Formula 3 can be synthesized by any known synthesis method of organic compounds, and the specific method is not specifically limited. For example, the compound of Chemical Formula 3 can be formed by dehydration condensation of a dianhydride compound and a diamine compound, etc.

And, the compound of Chemical Formula 3 is not volatized or decomposed at high temperature due to high boiling point, and thus, the curability of a polymerizable composition is stably maintained, and void that can have a bad influence on the properties is not formed during a high temperature processing or curing process.

Thus, for example, the compound of Chemical Formula 3 can have a decomposition temperature of 300° C. or more, 350° C. or more, 400° C. or more, or 500° C. or more. The decomposition temperature means a temperature at which the decomposition rate of the compound of Chemical Formula 3 is maintained in the range of 10% or less, 5% or less or 1% or less. The upper limit of the decomposition temperature is not specifically limited, but for example, it can be about 1,000° C. or less.

And, the compound of Chemical Formula 3 can easily control the reactivity or process window of the polymerizable composition itself, namely, a difference between the melting temperature and curing temperature of the polymerizable composition or prepolymer formed therefrom, by the selection of the core M or linker $X^1$ or $X^2$, and thus, act as a curing agent having various properties according to use.

The content of the curing agent can be adjusted in a range within which curability to be afforded to a polymerizable composition for providing the phthalonitrile-based resin can be secured.

As non-limiting examples, the curing agent can be included at a mole ratio of 0.01 to 1.5 moles per one mole of the phthalonitrile compound.

If the mole ratio of the curing agent becomes high, a process window can become narrow, and thus, processibility can be lowered, and high temperature curing conditions can be required. And, if the mole ratio of the curing agent becomes low, curability can become insufficient.

(3) Additives

In the polymerizable composition for providing the phthalonitrile-based resin, additives can be further included according to the application field or use of the phthalonitrile-based resin.

The kind of the additives is not specifically limited. And, the content of the additives can be adjusted in a range within which the properties of the phthalonitrile-based resin are not hindered.

As non-limiting examples, as the additives, reinforced fiber such as metal fiber, carbon fiber, glass fiber, aramid fiber, potassium titanate fiber, celluloid fiber, sepiolite fiber, ceramic fiber, and acrylic fiber; inorganic filler such as barium sulfate, calcium carbonate, zirconia, alumina, zirconium silicate, and silicon carbide; lubricant such as graphite, polytetrafluoroethylene, tungsten disulfide, molybdenum disulfide, and milled carbon fiber, and the like, can be applied.

(4) The Properties of Phthalonitrile-based Resin

Since the phthalonitrile-based resin has repeat units formed by the reaction of the phthalonitrile compound and curing agent as explained above it can exhibit excellent processibility and improved impact strength.

For example, the phthalonitrile-based resin can have impact strength of 350 MPa or more according to a ASTM D256 (23° C.) test method Specifically, the phthalonitrile-based resin can have impact strength according to a ASTM D256 (23° C.) test method, of 350 MPa or more, or 350 MPa to 500 MPa, or 400 MPa to 500 MPa, or 400 MPa to 490 MPa, or 420 MPa to 490 MPa, or 420 MPa to 480 MPa, or 430 MPa to 480 MPa, or 430 MPa to 480 MPa.

The phthalonitrile-based resin can have a process window of 50° C. or more.

Specifically, the process window of the phthalonitrile-based resin can be 50° C. or more, or 50° C. to 210° C., or 55° C. to 205° C.

The process window is one of the measures showing the processibility of resin, and can be represented by the absolute value of a difference ($T_c$-$T_p$) between the processing temperature ($T_p$) at which the phthalonitrile compound exists in a processible state and the curing temperature ($T_c$).

The processing temperature ($T_p$) means a temperature at which the phthalonitrile compound exists in a processible state, and can be exemplified as a glass transition temperature ($T_g$) or a melting temperature ($T_m$).

The curing temperature ($T_c$) can be exemplified as the exothermic onset temp., $T_o$ of the phthalonitrile-based resin.

II. Molded Article

According to another embodiment of the invention, a molded article comprising the phthalonitrile-based resin is provided.

The phthalonitrile-based resin can provide a molded article having excellent impact strength. As the molded article, durable goods of airplanes, ships, automobiles, and the like can be exemplified.

The molded article can be prepared by heating a prepolymer comprising the phthalonitrile-based resin to form into an aimed shape, and then, curing the same. The processing and curing for the preparation of the molded article can be conducted according to known methods.

Advantageous Effects

The phthalonitrile-based resin according to the present invention has excellent processibility and improved impact strength, and thus, can be appropriately used as durable goods in airplanes, ships, automobiles, and the like.

DETAILED DESCRIPTION OF THE EMBODIMENTS

Hereinafter, preferable examples are presented for better understanding of the present invention. However, these examples are presented only as the illustrations of the present invention, and the scope of the present invention is not limited thereby.

PREPARATION EXAMPLE 1

Synthesis of a Phthalonitrile Compound (PN1)

25.3 g of 4,4'-dihydroxybiphenyl and 145.0 g of DMF (dimethyl formamide) were introduced into a 3 neck round bottom flask, and stirred at room temperature to dissolve. Subsequently, 43.3 g of 4-nitrophthalonitrile was added, 70.0 g of DMF was added, and then, stirred to dissolve. Subsequently, 36.3g of potassium carbonate and 30.0 g of DMF were introduced together, and the temperature was raised to 85° C. while stirring. After reacting for about 5 hours, the solution was cooled to room temperature. The cooled reaction solution was poured into the aqueous solution of 0.2 N hydrochloric acid to neutralize and precipitate, and after filtering, washed with water. Thereafter, the filtered reactant was dried in a vacuum oven of 100° C. for a day, and water and remaining solvents were removed, thus obtaining a PN1 compound(4,4'-bis(3,4-dicyanophenoxy) diphenyloxide) of the following Chemical Formula 1 with the yield of 91 wt %.

Figure 1:
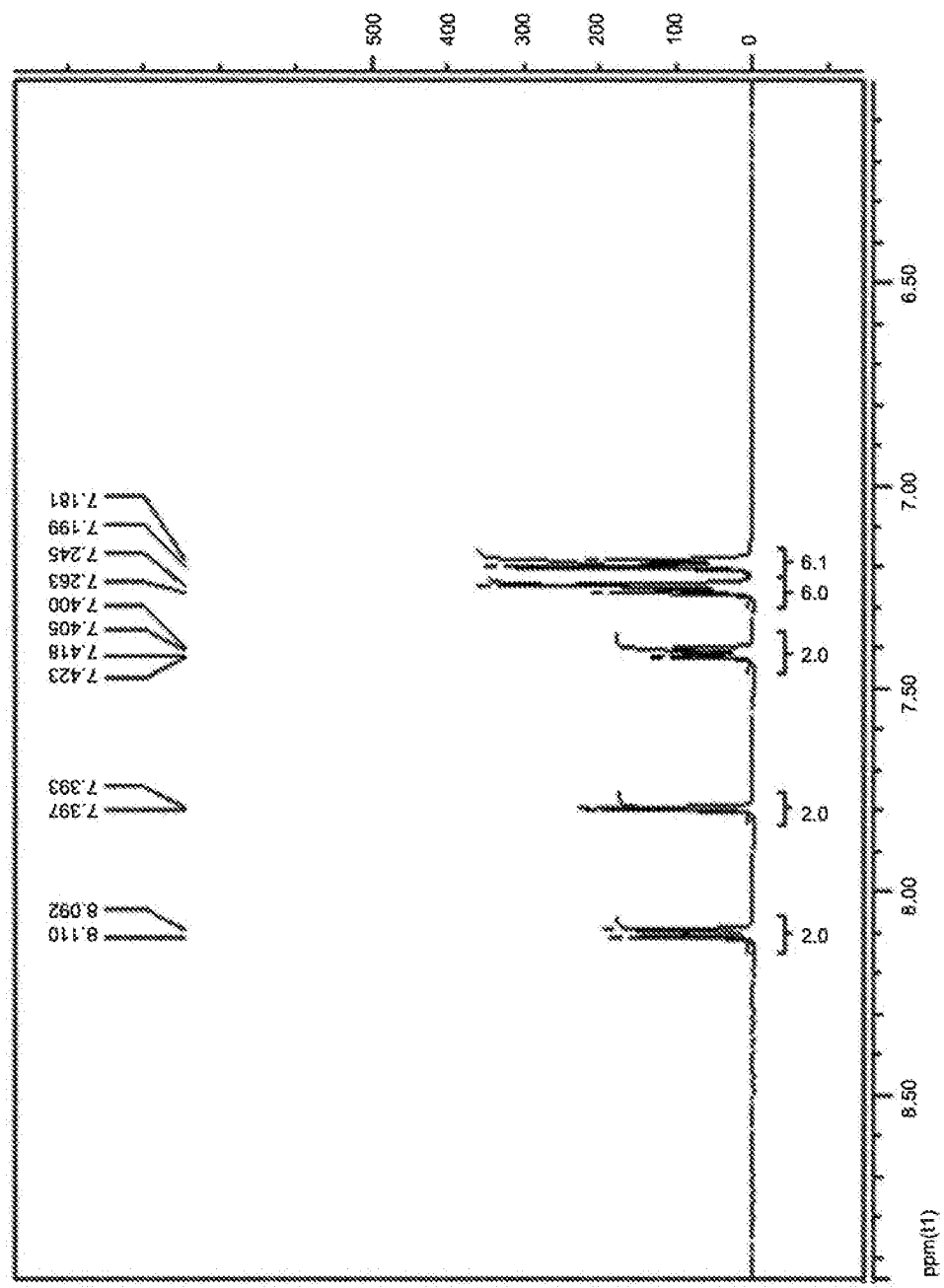
FIGS. 1 to 3 respectively show the $^1$H—NMR data of the compounds according to Preparation Examples 1 to 3.

The $^1$H-NMR analysis result for the obtained compound of the compound PN1 is shown in FIG. 1.

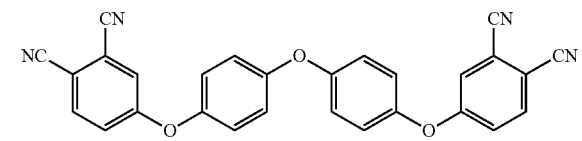

Chemical Formula 1

PREPARATION EXAMPLE 2

Synthesis of a Phthalonitrile Compound (PN2)

23.3 g of 4,4'-dihydroxybiphenyl and 140 g of DMF (dimethyl formamide) were introduced into a 3 neck round bottom flask, and stirred at room temperature to dissolve. Subsequently, 43.3 g of 4-nitrophthalonitrile was added, 70.0 g of DMF was added, and then, stirred to dissolve. Subsequently, 36.3g of potassium carbonate and 30.0 g of DMF were introduced together, and the temperature was raised to 85° C. while stirring. After reacting for about 5 hours, the solution was cooled to room temperature. The cooled reaction solution was poured into the aqueous solution of 0.2 N hydrochloric acid to neutralize and precipitate, and after filtering, washed with water. Thereafter, the filtered reactant was dried in a vacuum oven of 100° C. for a day, and water and remaining solvents were removed, thus obtaining a PN2 compound(4,4'-bis(3,4-dicyanophenoxy) biphenyl) of the following Chemical Formula 2 with the yield of 90 wt %.

Figure 2:
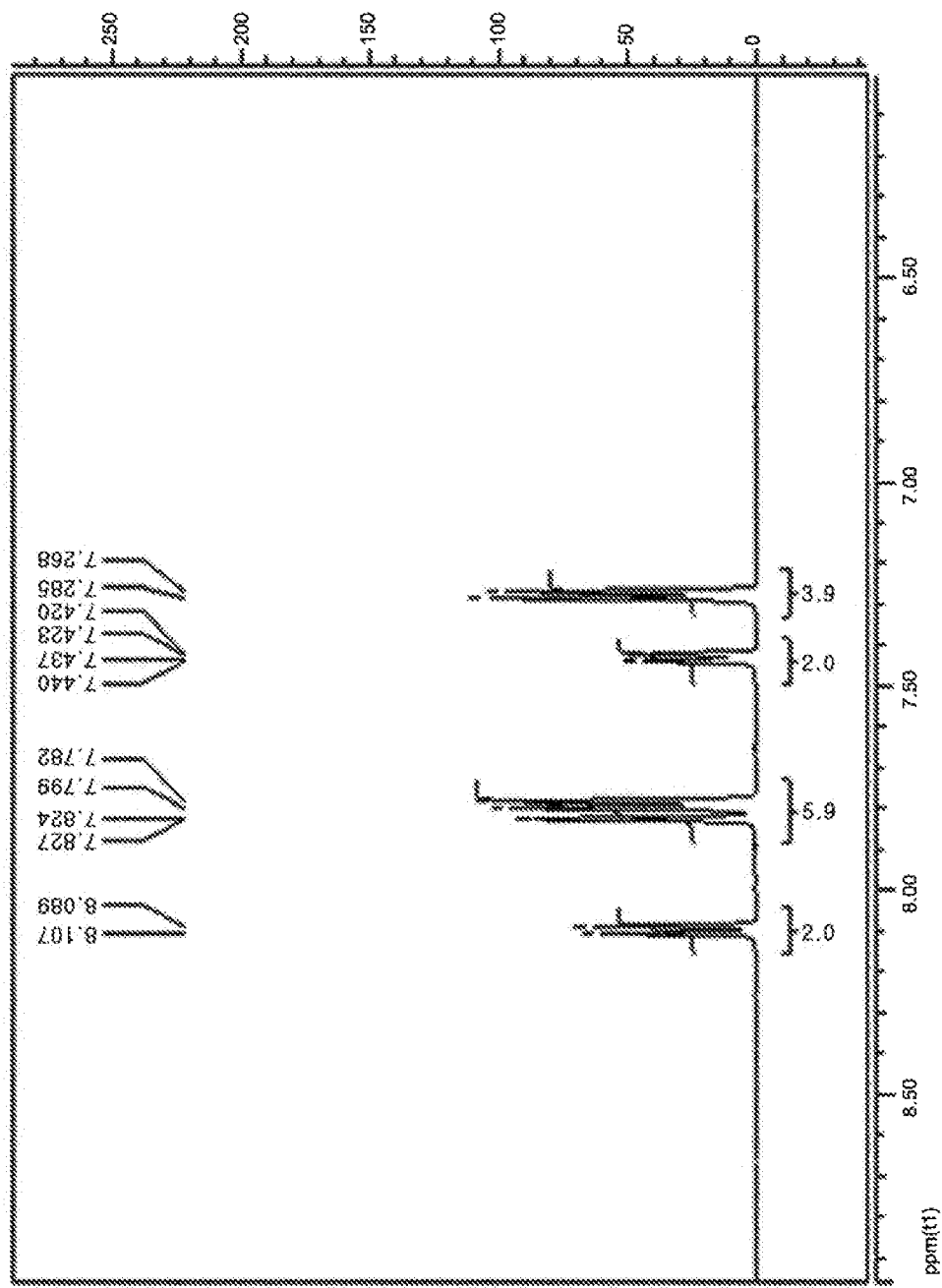

The $^1$H-NMR analysis result for the obtained compound of the compound PN2 is shown in FIG. 2.

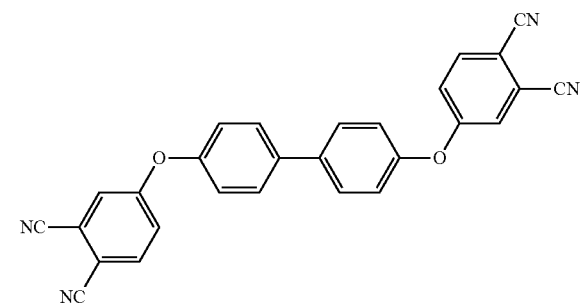

Chemical Formula 2

PREPARATION EXAMPLE 3

Synthesis of a Curing Agent Compound (CA1)

24 g of a compound of the following Chemical Formula a and 45 g of NMP (N-methyl-pyrrolidone) were introduced into a 3 neck round bottom flask, and stirred at room temperature to dissolve. The solution was cooled with a water bath, and 12.4 g of a compound of the following Chemical Formula b was gradually introduced in three portions together with 45 g of NMP. When the introduced compounds were completely dissolved, 18 g of toluene was added to the reactant to form an azeotrope. Dean-Stark equipment and a reflux condenser were installed, and the Dean-Stark equipment was filled with toluene. 4.2 mL of pyridine was introduced as a dehydrogenation condensation catalyst, a temperature was raised to 170° C., and the solution was stirred for 3 hours.

While removing water generated with the formation of an imide ring with the Dean Stark equipment, the solution was additionally stirred for 2 hours, and the remaining toluene and pyridine were removed. The reaction product was cooled to room temperature, and precipitated in methanol to recover. The recovered precipitate was extracted with methanol to remove remaining reactants, and dried in a vacuum oven to obtain a compound CA1 of Chemical Formula c with the yield of 81 wt %.

Figure 3:
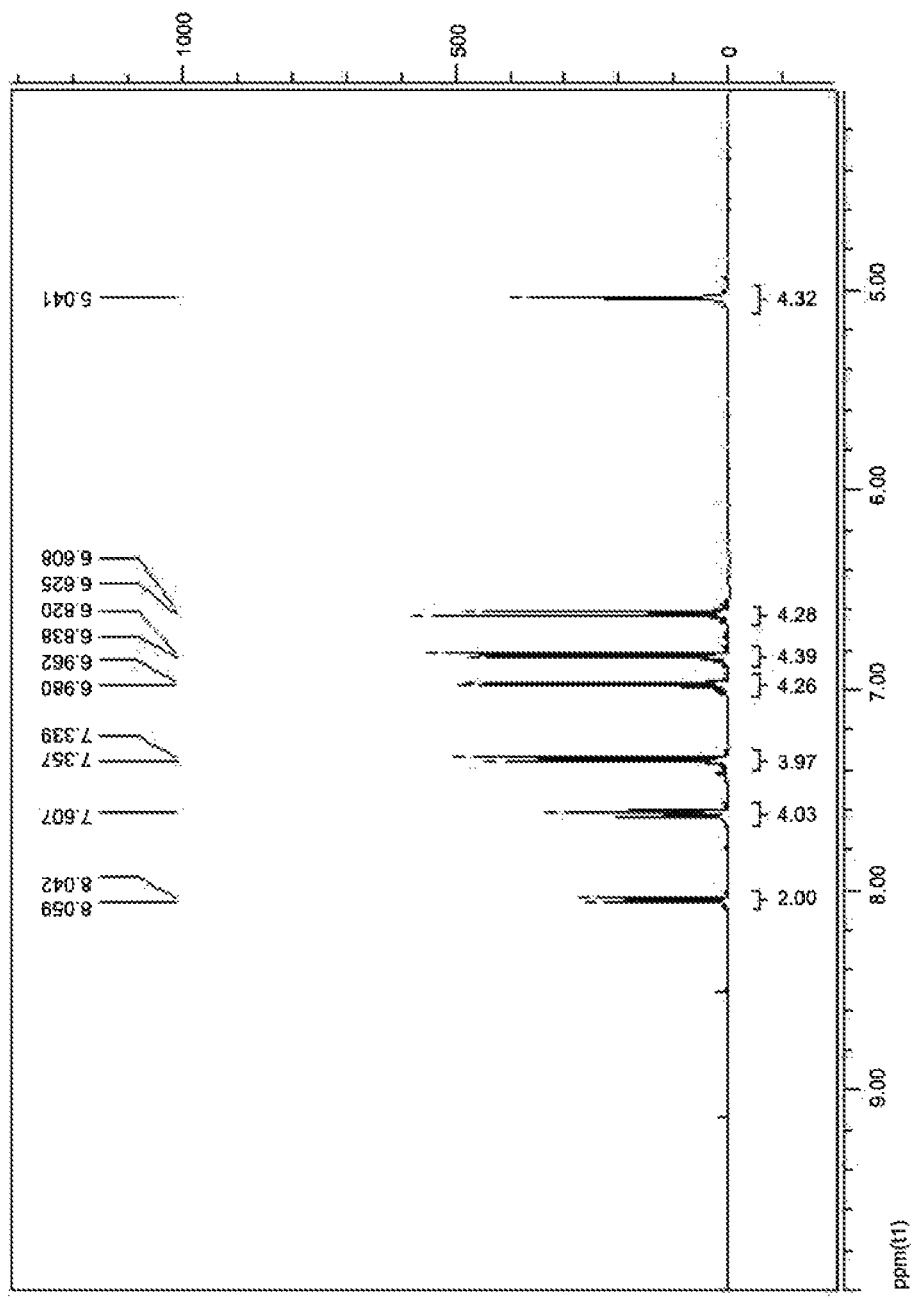

The $^1$H-NMR analysis results of the obtained compound CA1 is shown in FIG. 3.

The CA1 compound of Preparation Example 3 was mixed at 0.15 mole per one mole of the phthalonitrile compound to prepare a polymerizable composition.

The polymerizable composition was cured by heating in an oven at a temperature of 220° C., 250° C., 280° C., and 310° C. for a total of 3 hours, thus preparing phthalonitrile-based resin.

EXAMPLE 4

As a phthalonitrile compound, a mixture of 40 wt % of the PN1 compound of Preparation Example 1 and 60 wt % of the PN2 compound of Preparation Example 2 was prepared.

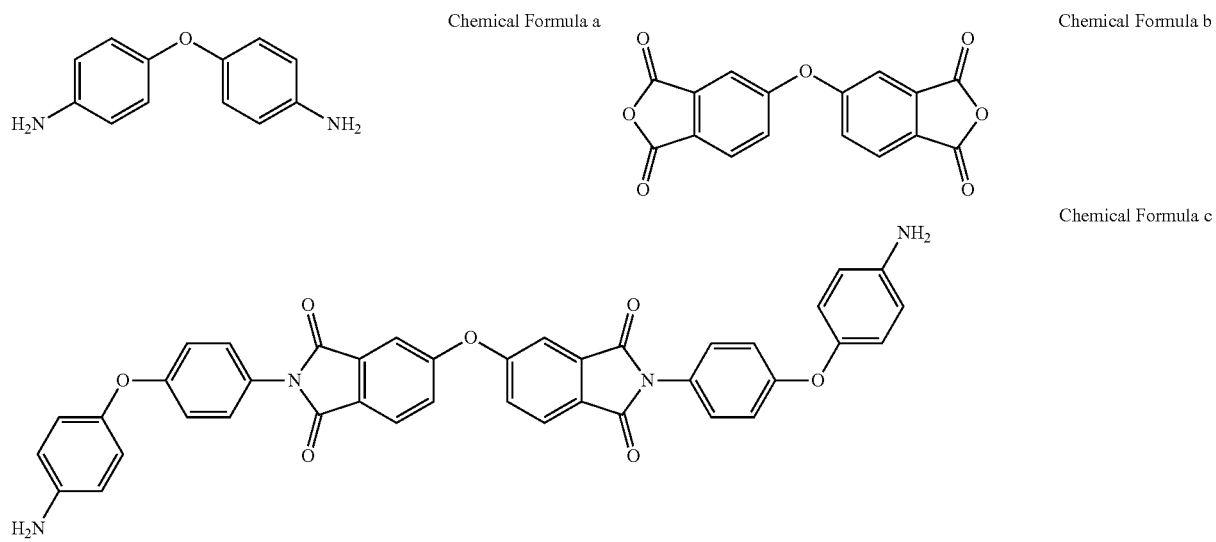

EXAMPLE 1

As a phthalonitrile compound, a mixture of 75 wt % of the PN1 compound of Preparation Example 1 and 25 wt % of the PN2 compound of Preparation Example 2 was prepared.

The CA1 compound of Preparation Example 3 was mixed at 0.15 mole per one mole of the phthalonitrile compound to prepare a polymerizable composition.

The polymerizable composition was cured through heating in an oven at a temperature of 220° C., 250° C., 280° C., and 310° C. for a total of 3 hours, thus preparing phthalonitrile-based resin.

EXAMPLE 2

As a phthalonitrile compound, a mixture of 60 wt % of the PN1 compound of Preparation Example 1 and 40 wt % of the PN2 compound of Preparation Example 2 was prepared.

The CA1 compound of Preparation Example 3 was mixed at 0.15 mole per one mole of the phthalonitrile compound to prepare a polymerizable composition.

The polymerizable composition was cured by heating in an oven at a temperature of 220° C., 250° C., 280° C., and 310° C. for a total of 3 hours, thus preparing phthalonitrile-based resin.

Example 3

As a phthalonitrile compound, a mixture of 50 wt % of the PN1 compound of Preparation Example 1 and 50 wt % of the PN2 compound of Preparation Example 2 was prepared.

The CA1 compound of Preparation Example 3 was mixed at 0.15 mole per one mole of the phthalonitrile compound to prepare a polymerizable composition.

The polymerizable composition was cured by heating in an oven at a temperature of 220° C., 250° C., 280° C., and 310° C. for a total of 3 hours, thus preparing phthalonitrile-based resin.

EXAMPLE 5

As a phthalonitrile compound, a mixture of 30 wt % of the PN1 compound of Preparation Example 1 and 70 wt % of the PN2 compound of Preparation Example 2 was prepared.

The CA1 compound of Preparation Example 3 was mixed at 0.15 mole per one mole of the phthalonitrile compound to prepare a polymerizable composition.

The polymerizable composition was cured by heating in an oven at a temperature of 220° C., 250° C., 280° C., and 310° C. for a total of 3 hours, thus preparing phthalonitrile-based resin.

EXAMPLE 6

As a phthalonitrile compound, a mixture of 90 wt % of the PN1 compound of Preparation Example 1 and 10 wt % of the PN2 compound of Preparation Example 2 was prepared.

The CA1 compound of Preparation Example 3 was mixed at 0.15 mole per one mole of the phthalonitrile compound to prepare a polymerizable composition.

The polymerizable composition was cured by heating in an oven at a temperature of 220° C., 250° C., 280° C., and 310° C. for a total of 3 hours, thus preparing phthalonitrile-based resin.

COMPARATIVE EXAMPLE 1

As a phthalonitrile compound, the PN1 compound of Preparation Example 1 was prepared.
The CA1 compound of Preparation Example 3 was mixed at 0.15 mole per one mole of the phthalonitrile compound to prepare a polymerizable composition.
The polymerizable composition was cured by heating in an oven at a temperature of 220° C., 250° C., 280° C., and 310° C. for a total of 3 hours, thus preparing phthalonitrile-based resin.

COMPARATIVE EXAMPLE 2

As a phthalonitrile compound, the PN2 compound of Preparation Example 2 was prepared.
The CA1 compound of Preparation Example 3 was mixed at 0.15 mole per one mole of the phthalonitrile compound to prepare a polymerizable composition.
The polymerizable composition was cured by heating in an oven at a temperature of 220° C., 250° C., 280° C., and 310° C. for a total of 3 hours, thus preparing phthalonitrile-based resin.

COMPARATIVE EXAMPLE 3

As a phthalonitrile compound, a mixture of 10 wt % of the PN1 compound of Preparation Example 1 and 90 wt % of the PN2 compound of Preparation Example 2 was prepared.
The CA1 compound of Preparation Example 3 was mixed at 0.15 mole per one mole of the phthalonitrile compound to prepare a polymerizable composition.
The polymerizable composition was cured by heating in an oven at a temperature of 220° C., 250° C., 280° C., and 310° C. for a total of 3 hours, thus preparing phthalonitrile-based resin.

COMPARATIVE EXAMPLE 4

As a phthalonitrile compound, a mixture of 25 wt % of the PN1 compound of Preparation Example 1 and 75 wt % of the PN2 compound of Preparation Example 2 was prepared.
The CA1 compound of Preparation Example 3 was mixed at 0.15 mole per one mole of the phthalonitrile compound to prepare a polymerizable composition.
The polymerizable composition was cured by heating in an oven at a temperature of 220° C., 250° C., 280° C., and 310° C. for a total of 3 hours, thus preparing phthalonitrile-based resin.

COMPARATIVE EXAMPLE 5

As a phthalonitrile compound, a mixture of 95 wt % of the PN1 compound of Preparation Example 1 and 5 wt % of the PN2 compound of Preparation Example 2 was prepared.
The CA1 compound of Preparation Example 3 was mixed at 0.15 mole per one mole of the phthalonitrile compound to prepare a polymerizable composition.
The polymerizable composition was cured by heating in an oven at a temperature of 220° C., 250° C., 280° C., and 310° C. for a total of 3 hours, thus preparing phthalonitrile-based resin.

EXPERIMENTAL EXAMPLE 1

$^1$H-NMR(Nuclear Magnetic Resonance) Analysis

For the compounds synthesized in Preparation Examples 1 to 3, $^1$H-NMR analysis was conducted. The results were shown in FIGS. 1 to 3.
The NMR analysis for the compounds prepared below was conducted according to the manual of the manufacturing company using 500 MHz NMR equipment of Agilent Inc. The sample for NMR measurement was prepared by dissolving the compound in DMSO(dimethyl sulfoxide)-d6.

EXPERIMENTAL EXAMPLE 2

DSC (Differential Scanning Calorimetry) Analysis

For the phthalonitrile-based resin obtained in Examples and Comparative Examples, DSC analysis was conducted. From the DSC thermogram, information about the glass transition temperature ($T_g$), melting temperature ($T_m$), and exothermic onset temp. ($T_o$) was obtained. The results were shown in the following Table 1. In the Table 1, a process window (PW) is an absolute value of a difference between the smaller value among $T_g$ and $T_m$ and $T_o$.
The DSC analysis was conducted under $N_2$ flow atmosphere while raising temperature from 35° C. to 450° C. at a temperature rise speed of 10° C/min using Q20 system of TA instruments.

EXPERIMENTAL EXAMPLE 3

Measurement of Impact Strength

A specimen without a notch of ASTM D256 standard was manufactured, and using a Digital impact tester (QM (700A)), the impact strength (IS) of the phthalonitrile-based was measured according to a ASTM D256 (23° C.) test method. The results were shown in the following Table 1.

EXPERIMENTAL EXAMPLE 4

Observation of the State of Resin After Curing

It was observed with unaided eyes whether or not a void exists in the phthalonitrile-based resin obtained in Examples and Comparative Examples.
Through relative evaluation, in case a void does not exist, it was classified as "○", in case many voids exist, it was classified as "X", and in case a little voids exist, it was classified as "Δ". The results were shown in the following Table 1.

TABLE 1

|  | $T_g$ (° C.) | $T_m$ (° C.) | $T_o$ (° C.) | PW (° C.) | IS (MPa) | Void |
|---|---|---|---|---|---|---|
| Example 1 | 69 | — | 278 | 209 | 430 | ○ |
| Example 2 | 69 | — | 277 | 208 | 454 | ○ |

TABLE 1-continued

| | $T_g$ (° C.) | $T_m$ (° C.) | $T_o$ (° C.) | PW (° C.) | IS (MPa) | Void |
|---|---|---|---|---|---|---|
| Example 3 | 71 | 206 | 277 | 206 | 459 | ○ |
| Example 4 | 69 | 209 | 274 | 65 | 440 | ○ |
| Example 5 | 68 | 215 | 273 | 65 | 437 | ○ |
| Example 6 | 64 | — | 278 | 214 | 415 | ○ |
| Comparative Example 1 | 63 | 189 | 283 | 94 | 297 | ○ |
| Comparative Example 2 | 75 | 229 | 289 | 60 | 232 | X |
| Comparative Example 3 | — | 225 | 273 | 48 | 235 | Δ |
| Comparative Example 4 | — | 217 | 273 | 56 | 331 | Δ |
| Comparative Example 5 | 64 | — | 278 | 214 | 302 | ○ |

Referring to Table 1, it was confirmed that the phthalonitrile-based resins according to Examples exhibit wide process window and excellent impact strength, and do not have void in the resin.

The invention claimed is:

1. A phthalonitrile-based resin, comprising repeat units formed by the reaction of a phthalonitrile compound and a curing agent,
wherein the phthalonitrile compound comprises 4,4'-bis(3,4-dicyanophenoxy)diphenyloxide of the following Chemical Formula 1 and 4,4'-bis(3,4-dicyanophenoxy)biphenyl of the following Chemical Formula 2 at a weight ratio of 30:70 to 90:10, and
wherein the curing agent is an imide-based compound of the following Chemical Formula 3:

Chemical Formula 1

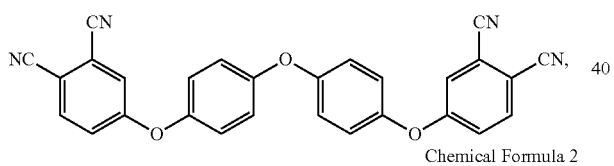

Chemical Formula 2

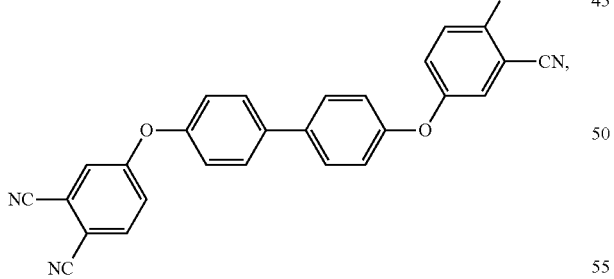

Chemical Formula 3

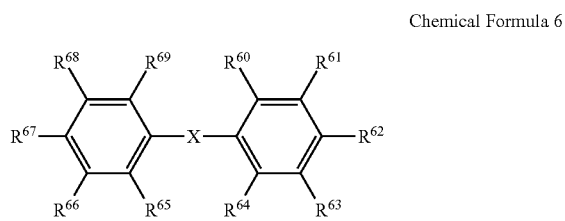

wherein in Chemical Formula 3:
M is a tetravalent radical derived from an aliphatic, alicyclic or aromatic compound;
each of $X^1$ and $X^2$ is independently an alkylene group, an alkylidene group, or a divalent radical derived from an aromatic compound; and
n is a number equal to or greater than 1.

2. The phthalonitrile-based resin according to claim 1, wherein M in Chemical Formula 3 is a tetravalent radical derived from alkane, alkene, or alkyne, or a tetravalent radical derived from a compound of any one of the following Chemical Formulas 4 to 9:

Chemical Formula 4

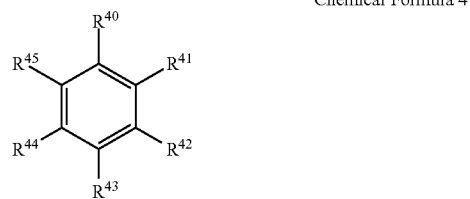

wherein in Chemical Formula 4, each of $R^{40}$ to $R^{45}$ is independently hydrogen, an alkyl group, an alkoxy group, or an aryl group;

Chemical Formula 5

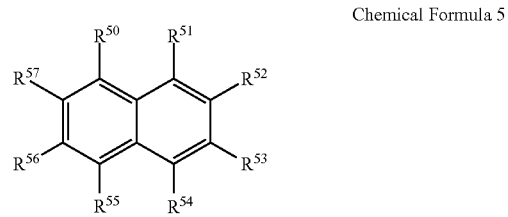

wherein in Chemical Formula 5, each of $R^{50}$ to $R^{57}$ is independently hydrogen, an alkyl group, an alkoxy group, or an aryl group;

Chemical Formula 6 wherein in Chemical Formula 6:
each of $R^{60}$ to $R^{69}$ is independently hydrogen, an alkyl group, an alkoxy group, or an aryl group;
X is a single bond, an alkylene group, an alkylidene group, —O—, —S—, —C(=O)—, —S(=O)—, —S(=O)$_2$—, —C(=O)—O-L$^1$-O—C(=O)—, -L$^2$-C(=O)—O-L$^3$-, -L$^4$-O-C(=O)-L$^5$-, or -L$^6$-Ar$^1$-L$^7$-Ar$^2$-L$^8$-;
each of $L^1$ to $L^8$ is independently a single bond, —O—, an alkylene group, or an alkylidene group; and
each of $Ar^1$ and $Ar^2$ is independently an arylene group;

Chemical Formula 7

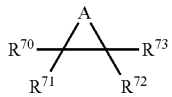

wherein in Chemical Formula 7:
each of $R^{70}$ to $R^{73}$ s independently hydrogen, an alkyl group, or an alkoxy group, and two of $R^{70}$ to $R^{73}$ an be connected to each other to form an alkylene group; and
A is an alkylene group or an alkenylene group, and the alkylene group or alkenylene group of A can comprise one or more oxygen atoms as a hetero atom;

Chemical Formula 8

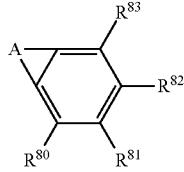

wherein in Formula 8:
each of $R^{80}$ to $R^{83}$ is independently hydrogen, an alkyl group, or an alkoxy group; and
A is an alkylene group;

Chemical Formula 9

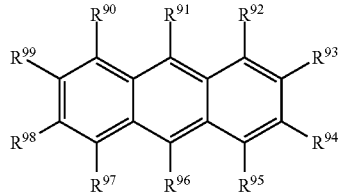

wherein in Chemical Formula 9, each of $R^{90}$ to $R^{99}$ is independently hydrogen, an alkyl group, or an alkoxy group.

3. The phthalonitrile-based resin according to claim 1, wherein in Chemical Formula 3, each of $X^1$ and $X^2$ is independently a divalent radical derived from a C6-40 aromatic compound.

4. The phthalonitrile-based resin according to claim 1, wherein in Chemical Formula 3, each of $X^1$ and $X^2$ is independently a compound of one of the following Chemical Formulas 10 to 12:

Chemical Formula 10

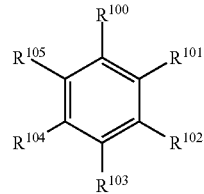

wherein in Chemical Formula 10, each of $R^{100}$ to $R^{105}$ is independently hydrogen, an alkyl group, an alkoxy group, an aryl group, a hydroxy group, or a carboxyl group;

Chemical Formula 11

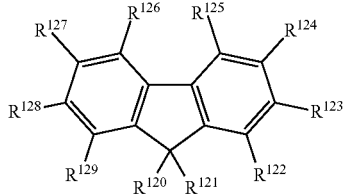

wherein in Chemical Formula 11:
each of $R^{100}$ to $R^{119}$ is independently hydrogen, an alkyl group, an alkoxy group, an aryl group, a hydroxy group, or a carboxyl group:
X' is a single bond, an alkylene group, an alkylidene group, —O—, —S—, —C(=O)—, —NR$^a$—, —S(=O)—, —S(=O)$_2$—, -L$^9$-Ar$^3$-L$^{10}$ or -L$^{11}$-Ar$^4$-L$^{12}$-Ar$^5$-L$^{13}$-;
$R^a$ is hydrogen, an alkyl group, an alkoxy group, or an aryl group;
each of $L^9$ to $L^{13}$ is independently a single bond, —O—, an alkylene group, or an alkylidene group; and
each of $Ar^3$ to $Ar^5$ is independently an arylene group;

Chemical Formula 12

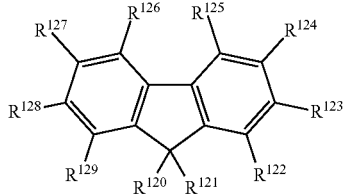

wherein in Chemical Formula 12, each of $R^{120}$ to $R^{129}$ is independently hydrogen, an alkyl group, an alkoxy group, an aryl group, a hydroxy group, or a carboxyl group.

5. The phthalonitrile-based resin according to claim 1, wherein the resin has impact strength of 350 MPa to 500 MPa according to a ASTM D256 (23° C.) test method.

6. A molded article comprising the phthalonitrile-based resin of claim 1.

* * * * *